United States Patent
Mullen et al.

(10) Patent No.: US 9,479,641 B2
(45) Date of Patent: Oct. 25, 2016

(54) SYSTEM AND METHOD FOR ROUTING A COMMUNICATION UTILIZING SCORING

(71) Applicant: Interactive Intelligence, Inc., Indianapolis, IN (US)

(72) Inventors: Nathan L. Mullen, Fishers, IN (US); Felix Immanuel Wyss, Zionsville, IN (US)

(73) Assignee: Interactive Intelligence Group, Inc., Indianapolis, IN (US)

( * ) Notice: Subject to any disclaimer, the term of this patent is extended or adjusted under 35 U.S.C. 154(b) by 0 days.

(21) Appl. No.: 14/043,637

(22) Filed: Oct. 1, 2013

(65) Prior Publication Data
US 2015/0092930 A1   Apr. 2, 2015

(51) Int. Cl.
*H04M 3/493* (2006.01)
*H04M 3/523* (2006.01)
*H04M 3/51* (2006.01)

(52) U.S. Cl.
CPC ......... *H04M 3/4936* (2013.01); *H04M 3/5232* (2013.01); *H04M 3/5175* (2013.01); *H04M 2201/40* (2013.01); *H04M 2203/2038* (2013.01)

(58) Field of Classification Search
CPC ......... H04M 2203/2044; H04M 3/42; H04M 3/42068
USPC .................. 379/88.01–88.04, 88.19, 88.21, 379/265.01–266.1, 67.1, 88.08, 88.22; 370/259
See application file for complete search history.

(56) References Cited

U.S. PATENT DOCUMENTS

| | | | |
|---|---|---|---|
| 6,404,857 B1 | 6/2002 | Blair et al. | |
| 6,411,687 B1 | 6/2002 | Bohacek et al. | |
| RE41,534 E | 8/2010 | Blair et al. | |
| 7,844,045 B2 | 11/2010 | Contolini et al. | |
| 7,856,095 B2 | 12/2010 | Brown | |
| 7,920,482 B2 | 4/2011 | Calahan et al. | |
| 8,180,027 B1 * | 5/2012 | Magnuson | H04M 3/2281 379/88.22 |
| 8,411,842 B1 | 4/2013 | Wu et al. | |
| 8,588,111 B1 * | 11/2013 | Kridlo | H04M 3/42221 370/259 |
| 8,787,532 B1 * | 7/2014 | Adam | H04M 3/5175 379/67.1 |
| 9,215,266 B2 * | 12/2015 | Kridlo | H04L 67/06 |
| 2005/0238161 A1 * | 10/2005 | Yacoub et al. | 379/265.06 |
| 2014/0219439 A1 * | 8/2014 | Farmer | 379/265.12 |

OTHER PUBLICATIONS

PCT International Search Report for related international application PCT/US13/62905 (filing date Oct. 1, 2013) mailed Jan. 3, 2014.

* cited by examiner

*Primary Examiner* — Md S Elahee

(57) ABSTRACT

A system and method are presented for routing a communication through monitoring one or more of words and voice characteristics of a communicant during an interaction. A communication may be handled based on a score. A score may be calculated based on several factors that are analyzed during an interaction, such as, amplitude, word usage, call metrics, etc. Previous interactions of communicants may also be factored into a score. Such handling may include specialized routing of the communication to a designated handler, for example. A communication may be continually evaluated during its occurrence and said evaluation data stored for future use.

30 Claims, 3 Drawing Sheets

SYSTEM AND METHOD FOR ROUTING A COMMUNICATION UTILIZING SCORING

BACKGROUND

The present invention generally relates to telecommunications systems and methods, as well as communication routing. More particularly, the present invention pertains to using scoring to monitor and route communications.

SUMMARY

A system and method are presented for routing a communication through monitoring one or more of words and voice characteristics of a communicant during an interaction. A communication may be handled based on a score. A score may be calculated based on several factors that are analyzed during an interaction, such as, amplitude, word usage, call metrics, etc. Previous interactions of communicants may also be factored into a score. Such handling may include specialized routing of the communication to a designated handler, for example. A communication may be continually evaluated during its occurrence and said evaluation data stored for future use.

In one embodiment, a method is presented for routing a communication comprising the steps of: monitoring at least one of: words and voice characteristics of a communicant during an interaction; determining a score for a communicant based on said monitoring; determining if a previous score exists for said communicant; analyzing at least one of: a score and a previous score; routing a communicant to an agent able to handle said communicant's score; continuing to evaluate communicant's score during said interaction; and storing evaluation data for future use.

In another embodiment, a system is presented for routing a communication comprising the steps of: a database capable of storing scores from previous and current interactions; a voice analyzer; routing software capable of routing a communication to an appropriate agent based on at least one of communicant scores and previous agent scores; and, a display capable of displaying scores and alerts.

In another embodiment, a method is presented for routing a communication comprising the steps of: monitoring at least one of words and voice characteristics of a communicant during an interaction; determining a score for a communicant; determining if a previous score exists for said communicant; and, analyzing at least one of a score and a previous score.

In another embodiment, a method is presented for routing a communication, comprising: monitoring at least one of words and voice characteristics of a communicant during an interaction; determining a score for a communicant based on temperament and disposition of said communicant; determining if a score exists for said communicant based on previous interactions; analyzing at least one of a score based on temperament and disposition and a score based on previous interactions; routing a communicant to an agent able to handle said communicant based on communicant's score; continuing to evaluate communicant's score; and, storing further evaluation data for future use.

DETAILED DESCRIPTION

Figure 1:
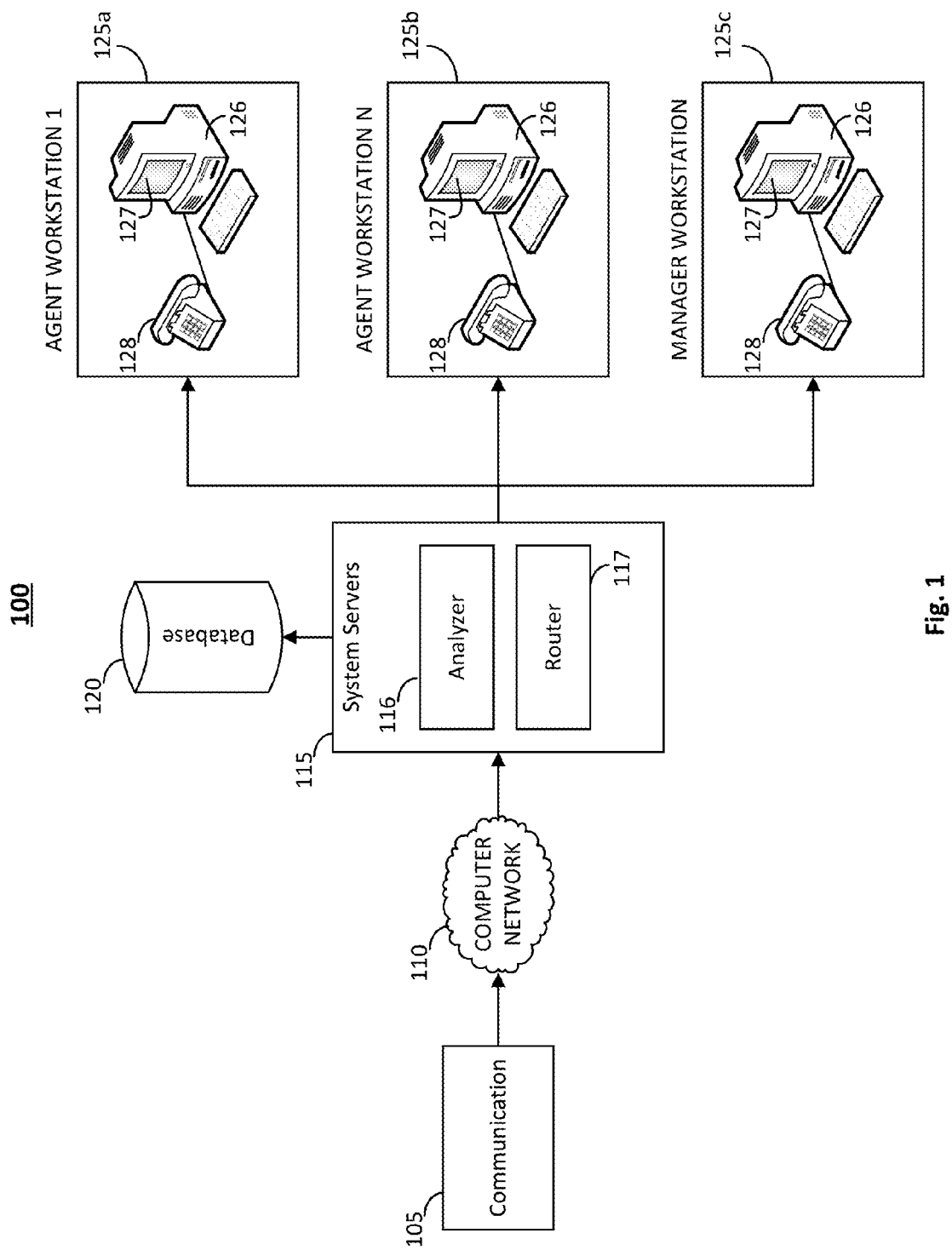
FIG. 1 is a diagram illustrating an embodiment of a system for routing a communication.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Scoring may be used to aid in routing communications to handlers. For example, a "personality score" may be a score based on a current communication. In one embodiment, a customer may interact with a call center. Keyword spotting may be performed on the customer's interaction with the interactive voice response (IVR) system. The keyword spotter may be trained for word recognition towards desired words such as polite words or rude words, for example. Amplitude, or emotion detection, may also be employed to detect how a communicant is interacting with the IVR. For example, if a customer is shouting, as opposed to speaking calmly, this may be detected. Other factors or voice characteristics may also be considered in scoring, such as whether or not a communicant is trying to talk over another communicant.

Scoring may also be determined based on a communicant's reputation. A communicant's reputation may have a separate, previous, score referred to as a reputation score. A reputation score may consist of an average of any number of personality scores from previous interactions. These scores may be stored in a database and linked to a particular communicant. For example, when a customer calls into a call center, a database lookup may be performed to determine if the customer has an existing reputation score. If so, this score may be used to help route calls alone or in conjunction with other factors, such as the personality score. Scores may be updated in real-time based on the interactions between communicants. A communicant may be calm at the onset of a call, but may become more angry as the call progresses. The score of the communicant may thus reflect such a change in the communicant. In one embodiment, a more experienced worker in a call center, such as a manager, may be notified of a change in score. The manager may re-route the call to a handler more equipped to deal with the situation, or take the call themselves. Efficiency may be obtained considering previous interactions in routing a communication to a handler. For example, prior relationships between customers and agents may be taken into account during call routing so that they are paired with each other if available. Difficult customers may be sent to handlers experienced with handling these types of customers while new hires may be sent easier calls.

FIG. 1 is a diagram illustrating an embodiment of a system for routing a communication indicated generally at 100. The basic components of a system may include: a Communication 105; a Network 110; System Servers 115, which may comprise an Analyzer 116 and a Router 117; a Database 120; Receiving Parties 125, such as any number of Agents and/or other personnel, such as a Manager.

A Communication 105 may comprise a communication received from a party. In at least one embodiment, a communication may be a telephone call coming into a call center from a customer or one placed by an automated dialer and routed to an agent. A communication may comprise any sort of verbal or visual communication such as a video chat, a telephone call, a message chat, etc.

A Network 110 may be in the form of a Local Area Network (LAN), Municipal Area Network (MAN), Wide Area Network (WAN), such as the Internet, a combination of these, or such other network arrangement as would occur to those skilled in the art. The operating logic of system 100 may be embodied in signals transmitted over network 110, in programming instructions, dedicated hardware, or a combination of these.

System Servers 115 may comprise an Analyzer 116 and a Router 117. In one embodiment, the Analyzer 116 may comprise IVR software and/or a keyword spotting mechanism for handling calls. The Analyzer 116 may actively analyze features such as a customer's voice amplitude and spoken words as they interact with the IVR and an agent. An agent's voice may also be analyzed or that of any other communicant. The Analyzer 116 may detect if the customer is using harsh or polite wording in their speech, emotion indicators such as voice amplitude, the frequency with which a customer is speaking over an agent, and other indicators that may be necessary or specified for determining a score. The Router 117 may be capable of routing a communication. For example, the router is responsible for routing a communication to the proper destination. The Router may examine the score of a customer from past scores, if applicable, and current interaction scores based on the IVR interaction, and determine the routing destination. In one embodiment, calls may be routed to less experienced agents if a customer is determined to be an "easier" customer based on their scoring. In another embodiment, a call may be routed to a more experienced agent if the customer has a history of being difficult, rude, or meets some other criteria. In another embodiment, an agent who receives a string of customers with a particular scoring range, such as those falling in the difficult range, may have an easier customer routed to them.

A Database 120 may comprise information that is accessed by the System Servers 115. In one embodiment, the Database 120 may store scores of communicants, such as customers and agents, from previous interactions. This information may be used to update a communicant's score during an interaction. In one embodiment, after a communication ends, the differences between the scores of the current call and previous interactions may be stored in the database to help influence future routing decisions for communications.

Receiving Parties 125 may comprise parties receiving the Communication 105. Such parties may comprise agents and/or other personnel staffing a communications center. In one embodiment, an agent may be present at a workstation, which may include a workstation computer 126 coupled to a display 127. Workstation computers 126 may be of the same type, or a heterogeneous combination of different computing devices. Likewise, displays 127 may be of the same type or a heterogeneous combination of different visual devices. It should be understood that while two agent workstations are described in the illustrative embodiment, any number may be utilized. Contact center applications of system 100 typically include many more workstations of this type at one or more physical locations, but only two are illustrated in FIG. 1 to preserve clarity.

A digital telephone 128 may be associated with agent workstations 125a and 125b. Additionally, a digital telephone 128 may be integrated into the agent computer 126 and/or implemented in software. It should be understood that a digital telephone 128, which is capable of being directly connected to network 110, may be in the form of a handset, headset, or other arrangement as would occur to those skilled in the art. It shall be further understood that the connection from computer network 110 to an agent workstation 125 can be made first to the associated workstation telephone, then from the workstation telephone to the workstation computer by way of a pass through connection on the workstation telephone. Alternatively, two connections from the network can be made, one to the workstation telephone and one to the workstation computer. Although not shown in order to preserve clarity, an agent workstation 125 may also include one or more operator input devices such as a keyboard, mouse, track ball, light pen, and/or microtelecommunicator, to name just a few representative examples. Additionally, besides display 127, one or more other devices may be included such as loudspeaker(s) and/or a printer.

In at least one embodiment, a display 127 may be used, such as by a Manager or an Agent, to view a communicant's score. Alerts may also be displayed in the event that a score differs significantly from a previous interaction or where there is a change in the current interaction. For example, a customer may have a history of being polite, based on their score from previous interactions with an agent in the call center. In the current interaction, the customer may begin using foul and offensive language, which is causing their score to change. At this point, an alert may be sent when the score change reaches a threshold and a manager or other person notified. The manager may be able to have the call routed to them and thus handle the situation which is making the customer upset. Scores, and differences from the scores of previous interactions, may also be presented in the form of a status report, in another embodiment.

Figure 2:
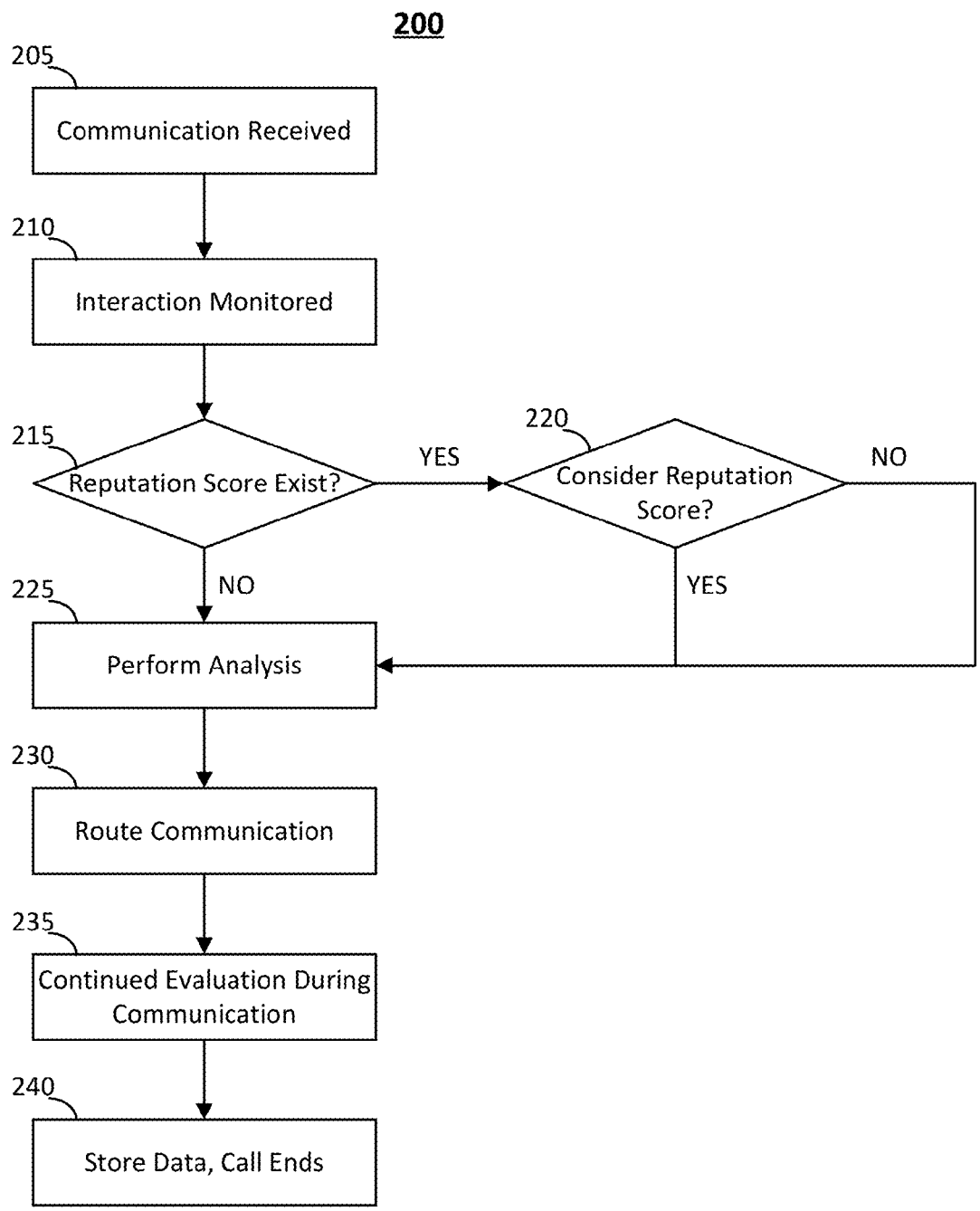
FIG. 2 is a flowchart illustrating an embodiment of a process for routing a communication.

FIG. 2 is a flowchart illustrating an embodiment of a process 200 for routing a communication. The process may be operative in the system 100.

In operation 205, a communication is received. In at least one embodiment, a communication may be a telephone call coming into a call center from a customer. In another embodiment, a communication may be a telephone call placed by an automatic dialer and transferred to an agent for handling. In another embodiment, an agent may also be answering calls or communications routed to them. Control is passed to operation 210 and process 200 continues.

In operation 210, an interaction is monitored. For example, the IVR may receive the communication and monitor the words and amplitude, or emotion, of the person speaking. In one embodiment, keyword spotting may be employed to monitor the spoken words of the interaction. Detection may be based on any number of criteria, such as rude words, swear words, polite words, etc. In another embodiment, amplitude, or emotion, detection may be used to detect anger, calmness, frustration, etc., in the speaker. In another embodiment, the interaction also may be monitored for a party talking over another, interruptions, etc. Control is passed to operation 215 and process 200 continues.

In operation 215, it is determined whether or not a reputation score exists. If it is determined that a reputation score exists, control is passed to operation 220 and process 200 continues. If it is determined that a reputation score does not exist, control is passed to operation 225 and process 200 continues.

The determination in operation 215 may be made based on any suitable criteria. For example, a database lookup may be performed to determine if a previous score exists for that communicant. Such a score may be representative of any number of previous interactions involving the communicant. For example, an average of scores from all interactions may be examined, or an average of some number of interactions. A score based on the prior interactions with a communicant generally is most effective in a setting, such as a call center, which has had multiple interactions with that same customer.

In operation 220, it is determined whether or not to consider a reputation score. If it is determined to consider a reputation score, control is passed to operation 225 and the process 200 continues. If it is determined not to consider a reputation score, control is passed to operation 225 and the process 200 continues.

The determination in operation 220 may be made based on any suitable criteria. For example, determining whether to consider a reputation score can be determined by a user of the system. In one embodiment, a reputation score may not be available for the communicant. Thus, there would not be a reputation score to consider. In another embodiment, a reputation score may exist, but may be excluded from consideration. The score may be retrieved and control is passed to operation 225 and process 200 continues.

In operation 225, analysis is performed. For example, a personality score or a reputation score, or both may be considered to determine how to route said communication. Control is passed to operation 230 and operation 200 continues.

In operation 230, a communication is routed. For example, based on the analysis performed in the prior operation, a communication may be routed to a desired handler. For example, it may be determined that the communicant, John, has a negative reputation score because he has spoken over agents in the past. When he calls into the call center, his reputation score may factor into his communications being routed to more experienced handlers since the call may be more difficult. In another example, communicant Matt has a positive reputation score because he is not angry, does not talk over the handler, and uses polite words. When he calls into the center, his reputation score may be used to route his calls to a less-experienced agent since he may be an easier customer to handle. In another example, communicant Susan may be a first-time caller. She does not have a previous score to aid in routing. The IVR may notice that she is angry and using rude words when interacting with it. A negative score may be assigned to her and her call thus routed to a handler who may be more experienced. In yet another example, communicant Jana is a first-time caller who does not have a previous score to aid in routing. The IVR may notice that she responds in a normal voice to the IVR prompts and is not using rude words. The call may thus be routed to a less-experienced agent since she may not be a difficult customer to handle.

In another embodiment, scores may be used to help ease stress on an agent. For example, if a handler receives a string of customers with personality scores in the "difficult" range, then a more favorable customer may be routed to the handler. This may be achieved by accumulating the scores of an agent's customers of some previous number of interactions. Conversely, "difficult" customers may be routed to agents who have had a string of "easy" customers in a manner that would spread out "difficult" customers among the agents.

In another embodiment, it may be determined that some agents work better with specific customers or certain types of customers. Communications may be automatically routed to agents based on such criteria when that specific customer calls in. Control is passed to operation 235 and process 200 continues.

In operation 235, continued evaluation during a communication occurs. For example, in one embodiment, the reputation score of the customer may be shown to the manager monitoring the interaction between said customer and an agent. The manager may determine if a normally nice customer is being particularly heated during the interaction. Conversely, it may also be noted if a normally difficult customer is being particularly difficult on that interaction. Live feedback may be presented to the call monitor through such means as a display. The call monitor may comprise a manager, an agent, or some other monitoring entity. The live feedback may indicate how the interactions are proceeding by way of a personality score of the customer along with the reputation score, or scoring of previous interactions, of the customer. In one embodiment, score differences may be noted and examined to determine if there was a difference in handling that could have altered the score. Control is passed to operation 240 and process 200 continues.

In operation 240, data is stored, the call ends, and the process 200 ends.

Figure 3:
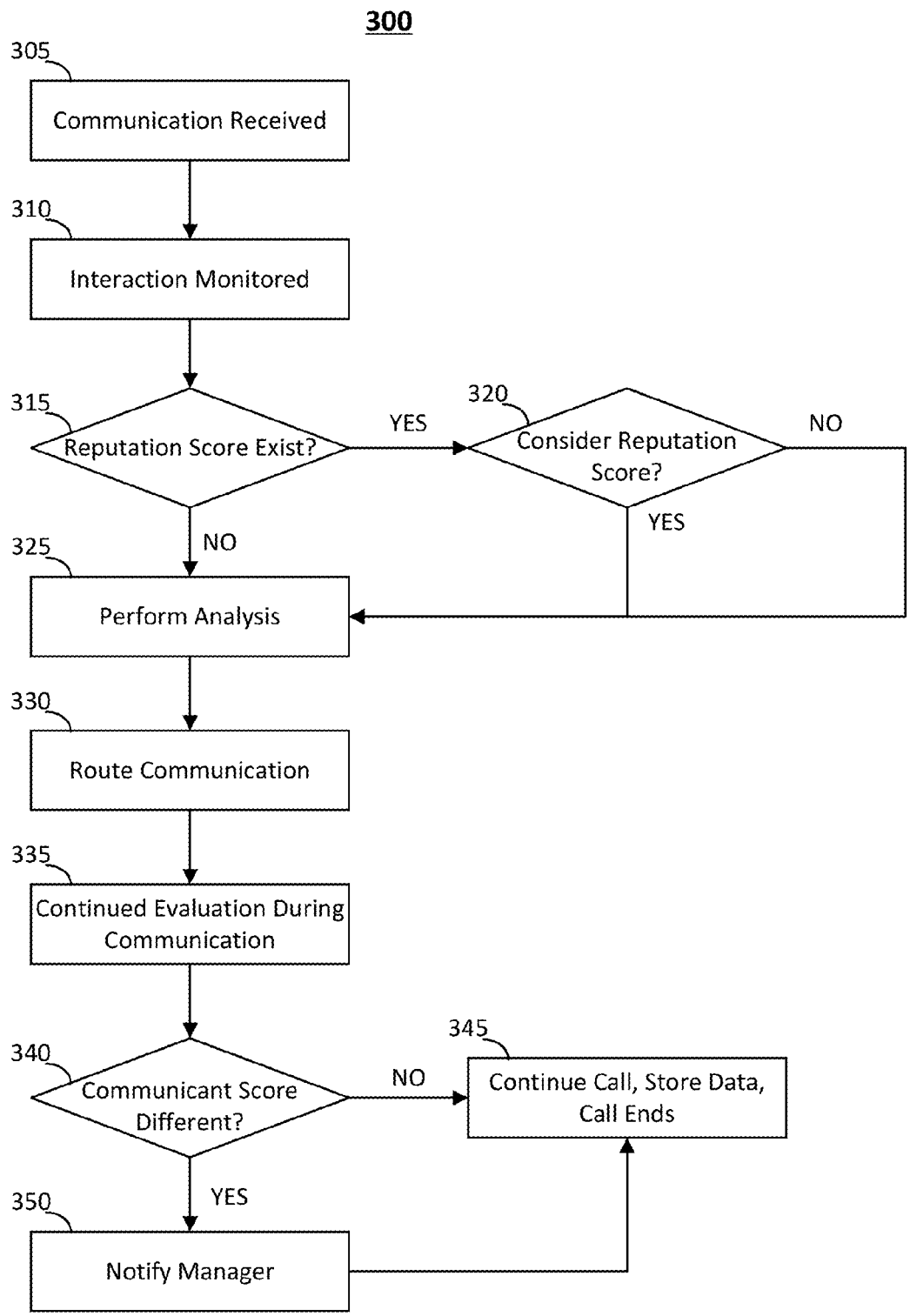
FIG. 3 is a flowchart illustrating an embodiment of a process for routing a communication.

FIG. 3 is a flowchart illustrating an embodiment of a process 300 for routing a communication. The process may be operative in the system 100.

In operation 305, a communication is received. In at least one embodiment, a communication may be a telephone call coming into a call center from a customer. In another embodiment, a communication may be a telephone call placed by an automatic dialer and transferred to an agent for handling. In another embodiment, an agent may also be answering calls or communications routed to them. Control is passed to operation 310 and process 300 continues.

In operation 310, an interaction is monitored. For example, the IVR may receive the communication and monitor the words and amplitude, or emotion, of the person speaking. In one embodiment, keyword spotting may be employed to monitor the spoken words of the interaction. Detection may be based on any number of criteria, such as rude words, swear words, polite words, etc. In another embodiment, amplitude, or emotion, detection may be used to detect anger, calmness, frustration, etc., in the speaker. In another embodiment, the interaction also may be monitored for a party talking over another, interruptions, etc. Control is passed to operation 315 and process 300 continues.

In operation 315, it is determined whether or not a reputation score exists. If it is determined that reputation score exists, control is passed to operation 320 and process 300 continues. If it is determined that a reputation score does not exist, control is passed to operation 325 and process 300 continues.

The determination in operation 315 may be made based on any suitable criteria. For example, a database lookup may be performed to determine if a previous score exists for that communicant. Such a score may be representative of any number of previous interactions involving the communicant. For example, an average of scores from all interactions may be examined, or an average of some number of interactions. A score based on the prior interactions with a communicant generally is most effective in a setting, such as a call center, which has had multiple interactions with that same customer.

In operation 320, it is determined whether or not to consider a reputation score. If it is determined to consider a reputation score, control is passed to operation 325 and the process 300 continues. If it is determined not to consider a reputation score, control is passed to operation 325 and the process 300 continues.

The determination in operation 320 may be made based on any suitable criteria. For example, determining whether to consider a reputation score can be determined by a user of the system. In one embodiment, a reputation score may not be available for the communicant. Thus, there would not be a reputation score to consider. In another embodiment, a reputation score may exist, but may be excluded from consideration. The score may be retrieved and control is passed to operation 325 and process 300 continues.

In operation 325, analysis is performed. For example, a personality score or a reputation score, or both may be considering to determine how to route said communication. Control is passed to operation 330 and operation 300 continues.

In operation 330, a communication is routed. For example, based on the analysis performed in the prior operation, a communication may be routed to a desired handler in a similar manner as described in operation 225 (FIG. 2). Control is passed to operation 335 and process 300 continues.

In operation 335, continued evaluation during a communication occurs. For example, in one embodiment, the reputation score of the customer may be shown to the manager monitoring the interaction between said customer and an agent. The manager may determine if a normally nice customer is being particularly heated during the interaction. Conversely, it may also be noted if a normally difficult customer is being particular difficult on that interaction. Live feedback may be presented to the call monitor through such means as a display. The call monitor may comprise a manager, an agent, or some other monitoring entity. The live feedback may indicate how the interactions are proceeding by way of a personality score of the customer along with the reputation score, or scoring of previous interactions, of the customer. In one embodiment, score differences may be noted and examined to determine if there was a difference in handling that could have altered the score. Control is passed to operation 340 and process 300 continues.

In operation 340, it is determined whether or not a communicant's score is different. If it is determined that a communicant's score is not different, control is passed to operation 345 and process 300 continues. If it is determined that a communicant's score is different, control is passed to operation 350 and process 300 continues.

The determination in operation 340 may be made based on any suitable criteria. For example, during a communication, if the communicant's personality score begins to significantly differ from that of previous interactions, then the system may trigger some kind of action that needs attention. The degree in differences between scores may be user-specified and fall within a certain threshold. For example, the difference may be a certain variance given as percentage of the score or a range, such as within 10 points of the score.

In operation 345, data is stored, the call ends, and the process 300 ends.

In operation 350, a manager may be notified. For example, a manager may receive an alert on their display notifying them that there is a difference in the personality and reputation scores of one or more communicants in an interaction. In one embodiment, a manager may have the call re-routed, such as to a more experience agent, or take other appropriate measures to handle the interaction. Control is passed back to operation 345 and the process 300 continues.

In one embodiment of the system, scoring may be applied to an agent as opposed to a customer. This may help a call center determine statistical correlation between an agent's interactions and their successes in their particular field. Such information may also be useful for training purposes. The score of the agent may be monitored during an interaction and feedback could be provided. Such feedback may be used to alter behavior of a call handler or make other determinations, such as if an agent is in need of a break. The score may also be used for routing calls, for instance, if an agent has a particular relationship with a customer and they have a history of working well together, that customer's call may be routed to the specific agent.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for routing a communication in a contact center, wherein said contact center comprises at least an interactive voice response system, the method comprising the steps of:
   a. monitoring, in real-time, words and voice characteristics of a communicant during an interaction with the interactive voice response system;
   b. determining a score for the communicant based on said monitoring;
   c. determining if a previous score exists in a database for said communicant, wherein said database comprises scores from previous and current interactions of the contact center, for said communicant;
   d. analyzing at least one of: a score and a previous score;
   e. routing a communicant to an agent, wherein said agent has a skillset which enables the agent to handle said communicant based at least on the analyzing of step (d);
   f. continuing to evaluate, in real-time, communicant's score during said interaction; and,
   g. storing evaluation data in the database for future use.

2. The method of claim 1, wherein the determining of step (b) further comprises examining one or more of the following factors: voice amplitude, customer talking over agent, rude word usage, polite word usage, hold time length, temperament, and disposition.

3. The method of claim 1, wherein the previous score comprises stored scores from previous interactions linked to a communicant.

4. The method of claim 3, wherein said previous score is calculated from an average of scores from all interactions for said communicant.

5. The method of claim 3, wherein said previous score is calculated from an average of some number of previous interactions for said communicant.

6. The method of claim 1, wherein the monitoring of words in step (a) is performed with keyword spotting.

7. The method of claim 1, wherein the routing of step (e) is based on at least one of the following agent criteria: experience, skill level, personality, score, and stress reduction.

8. The method of claim 1, wherein step (f) further comprises the step of calculating a difference between scores of current interactions and previous interactions.

9. The method of claim 8, further comprising the step of sending a notification if the communicant's score differs significantly from previous interactions.

10. The method of claim 1, further comprising the step of evaluating an agent's score based on communications with communicants.

11. The method of claim 10 further comprises the step of evaluating an agent's personality by determining a statistical correlation between agent personality and communication handling success.

12. The method of claim 11 further comprising the step of using said evaluation to monitor agents work and status and providing real-time feedback.

13. The method of claim 11 further comprising the step of using said evaluation to determine future routing of communications.

14. The method of claim 1, wherein a score trends negative for adverse behavior.

15. The method of claim 1, wherein a score trends positive for good behavior.

16. The method of claim 1, wherein step (e) further comprises distributing communications with negative trending scores across available agents.

17. A system for routing a communication in a contact center comprising:
   a. a database capable of storing scores from previous and current interactions, wherein scores are determined by monitoring, in real-time, words and voice characteristics of a communicant during interactions with an interactive voice response system of said contact center;
   b. a voice analyzer, wherein said voice analyzer comprises an interactive voice response system, and said analyzer is operatively coupled to the database;
   c. a communication router routing a communication to an appropriate agent based on at least one of communicant scores and previous agent scores, wherein said communication router is operatively coupled to the database and the voice analyzer; and,
   d. a display displaying scores and alerts received from at least one of: the voice analyzer and the communication router.

18. A method for routing a communication in a contact center, wherein said contact center comprises at least an interactive voice response system, the method comprising the steps of:
   a. monitoring, in real-time, words and voice characteristics of a communicant during an interaction with the interactive voice response system;
   b. determining a score for the communicant based on temperament and disposition of said communicant;
   c. determining if a score exists for said communicant based on previous interactions;
   d. analyzing at least one of: a score based on temperament and disposition and a score based on previous interactions;
   e. routing a communicant to an agent able to handle said communicant based at least on the analyzing step (d);
   f. continuing to evaluate communicant's score during the interaction; and,
   g. storing further evaluation data for future use.

19. The method of claim 18, wherein said score based on previous interactions is calculated from an average of some number of previous interactions.

20. The method of claim 18, wherein the monitoring of words in step (a) is performed with keyword spotting.

21. The method of claim 18, wherein the routing of step (e) is based on at least one of: experience, skill level, personality, score, and stress reduction.

22. The method of claim 21, further comprising the step of sending a notification if the communicant's score differs significantly from the scores of previous interactions.

23. The method of claim 18, further comprising the step of evaluating an agent's score based on communications with communicants.

24. The method of claim 23 further comprising the step of evaluating an agent's personality by determining a statistical correlation between agent personality and communication handling success.

25. The method of claim 24 further comprising the step of using said evaluation to monitor an agent's work and status and providing real-time feedback.

26. The method of claim 24, further comprising the step of using said evaluation to determine future routing of communications.

27. The method of claim 18, wherein a score trends negative for adverse behavior.

28. The method of claim 18, wherein a score trends positive for good behavior.

29. The method of claim 18, wherein step (e) further comprises distributing communications with negative trending scores across available agents.

30. The method of claim 18, wherein step (f) further comprises evaluating scores in real time.

* * * * *